United States Patent [19]

Farr

[11] Patent Number: 5,042,884

[45] Date of Patent: Aug. 27, 1991

[54] HYDRAULIC BRAKING SYSTEMS FOR VEHICLES

[75] Inventor: Glyn P. R. Farr, Warwickshire, England

[73] Assignee: Lucas Industries public limited company, England

[21] Appl. No.: 438,621

[22] Filed: Nov. 17, 1989

[30] Foreign Application Priority Data

Nov. 25, 1988 [GB] United Kingdom ............... 8827614.2
Nov. 25, 1988 [GB] United Kingdom ............... 8827615.9

[51] Int. Cl.[5] ............................................ B60T 8/36
[52] U.S. Cl. ...................................... 303/100; 303/111; 303/9.71
[58] Field of Search .................... 188/181 C; 303/9.66, 303/9.71, 9.73, 100, 103, 110, 111, 114, 115

[56] References Cited

U.S. PATENT DOCUMENTS

| 4,229,049 | 10/1980 | Ando | 303/9.71 X |
| 4,511,185 | 4/1985 | Wloczyk | 303/9.71 |
| 4,637,664 | 1/1987 | Arikawa | 303/111 |

FOREIGN PATENT DOCUMENTS 01344040 8/1984 Japan ................................ 303/9.71

Primary Examiner—Robert J. Oberleitner
Assistant Examiner—Alfred Muratori
Attorney, Agent, or Firm—Laff, Whitesel, Conte & Saret

[57] ABSTRACT

In an hydraulic braking system for a vehicle the rear wheel brakes are adapted to be applied by a fluid pressure generated by, and dependent upon, the pressure applied to at least one of the front wheel brakes. Control of the rear wheel brakes may be achieved by a fluid power unit under the control of at least one solenoid-operative valve which, in turn, is responsive to signals from sensing means responsive to the behaviour of the rear wheels.

13 Claims, 7 Drawing Sheets

HYDRAULIC BRAKING SYSTEMS FOR VEHICLES

This invention relates to hydraulic braking systems for vehicles of the four wheel type provided with a brake on each wheel.

In some known braking systems of the kind set forth each front wheel brake forms a separate brake circuit with the source of brake-applying fluid, and both rear wheel brakes form a third independent circuit with the source of brake-applying fluid for the rear brakes.

Such known systems usually comprise a triple master cylinder, of which the three pressure spaces each comprise the source for a respective circuit, and a separate brake pressure modulator may be incorporated in each circuit. In such a system each modulator comprises an expander piston to relieve the pressure in a respective brake or brakes in an anti-lock mode, and a pump including a piston to generate a pressure to re-apply the brake or brakes automatically. Normally the three expander pistons, and the three pump pistons are combined in a single assembly and are driven by a common motor.

In such known systems the provision of a third pump piston for the rear wheel brake increases motor torque, a triple master cylinder is unacceptably long and creates installation difficulties, and the system is further complicated by the provision of the third expander piston for the rear wheel brakes.

According to our invention, in an hydraulic braking system of the kind set forth, the rear wheel brakes are adapted to be applied by a fluid-pressure generated by, and dependent upon, the pressure applied to at least one of the front wheel brakes.

Conveniently both rear wheel brakes are adapted to be applied by a control valve assembly of which the output pressure applied to the rear wheel brakes is dependent upon the mean value of the sum of the pressures applied to the two front wheel brakes.

Preferably the input pressure to the rear brakes is proportioned to the mean value of the sum of the pressures applied to the two front wheel brakes.

A decrease in one front brake pressure produces a decrease in the rear brake pressure, and may produce a minor increase in the pressure applied to the other front wheel brake.

Our system provides substantial stopping power in the event of failure of one circuit by the utilisation of the brake on the front wheel of the other, operative, circuit, and both rear wheel brakes. Should both rear brakes fail, then both front wheel brakes can still be applied.

The fluid pressure supply to the rear wheel brakes may comprise an auxiliary master cylinder defined by an auxiliary piston working in a bore, a pressure space leading to the rear wheel brakes and defined by a portion of the bore in advance of the piston, and a recuperation valve means between the pressure space and a reservoir for fluid and which is adapted to close to isolate the pressure space from the reservoir upon initial movement of the piston in a brake-applying direction, further movement of the piston in the same direction pressurising the fluid in the pressure space to apply the brakes.

In one construction the auxiliary piston is adapted to be advanced in its bore by the two pressures applied to the front wheel brakes which act over different faces of substantially equal areas of a balance piston adapted to co-operate with the auxiliary piston, the faces being so arranged that the forces generated by the two pressures act in the same direction. Upon failure therefore of either front brake circuit, the rear brakes can still be applied by operation of the auxiliary master cylinder in response to pressure in the remaining, operative, front brake circuit, but at substantially one-half the input pressure.

The auxiliary piston and the balance piston may be combined into a single piston assembly.

Each front wheel brake can therefore be applied by pressure generated in a respective pressure space of a tandem master cylinder.

Control of the rear wheel brakes may be achieved by a fluid powered unit under the control of at least one solenoid-operated valve means which, in turn, is responsive to signals from sensing means responsive to the behaviour of the wheels.

The fluid powered unit may comprise a stepped de-boost piston working in a stepped bore and having a first portion of smaller area exposed to the brakes and a second portion of larger area defining a pressure-responsive control member, an isolating valve, and a double-seated solenoid-operated valve. Normally the de-boost piston is sustained in an advanced position by a pressure differential acting across the control member, in which position it holds the isolating valve open, and the solenoid-operated valve acts in a first position to establish the pressure differential. When a situation occurs in which the rear brakes are to be relieved, for example in an anti-lock mode, or to be prevented from being applied, for example when a brake on a front wheel is applied to prevent wheel spin, the solenoid-operated valve moves into a second position to destroy the pressure differential with the result that the piston moves into a retracted position, initially to permit the isolating valve to close and isolate the fluid pressure supply from the brakes and thereafter to increase the effective volume of a smaller portion of the bore in which the first portion works, whereby to relieve any pressure applied to the brakes.

The system according to our invention is particularly suited for use to achieve anti-lock control of the rear wheel brakes of light commercial vehicles, because:

1) The rear axle load varies greatly between an empty vehicle and fully laden and with a conventional braking system the chance of premature rear wheel lock is high;

2) It is difficult to meet the braking regulations for maximum pedal effort in the half system failed case; and 3) The elimination of rear wheel locking improves vehicle stability and, since linked apportioning valves are no longer required, the 'add-on' costs are small.

In a modification the behaviour of each front wheel can be controlled by a separate powered modulator. This therefore achieves a three channel anti-lock system, namely individual control of each front wheel with shared control of the two rear wheels.

When the tandem master cylinder is operated by a pneumatic booster, such a three channel anti-lock system can then be further adapted to control the driven front wheels of a front-wheel drive vehicle in order to provide traction control by preventing a driven front wheel from spinning. This is achieved by the provision of a second solenoid-operated valve means for controlling energisation of booster independently of the foot pedal and in response to signals from wheel speed sensors associated with both front wheels, whereby the master cylinder is operated to apply the brakes but the brake on the non-spinning front wheel is prevented from being applied by the modulator for that wheel, and the brakes on the rear wheels are prevented from being applied by simultaneous energisation of the solenoid-operated valve means for anti-lock control of the rear wheels.

In the system described above the fluid powered unit may utilise a pneumatic pressure differential between atmosphere and a source of vacuum, suitably a connection to the manifold of the engine of the vehicle. In another construction, the pressure differential is produced between compressed air and atmosphere. The source of compressed air may comprise the supply of compressed air for an air suspension system which has the advantage that the pressure in rear wheel suspension struts determines the magnitude of rear pressure which can be applied to the rear wheel brakes.

Preferably the pressure-responsive control member is resiliently biased in one direction to correct the cut-in pressures for various laden cases.

Some embodiments of our invention are illustrated in the accompanying drawings in which.

Figure 1:
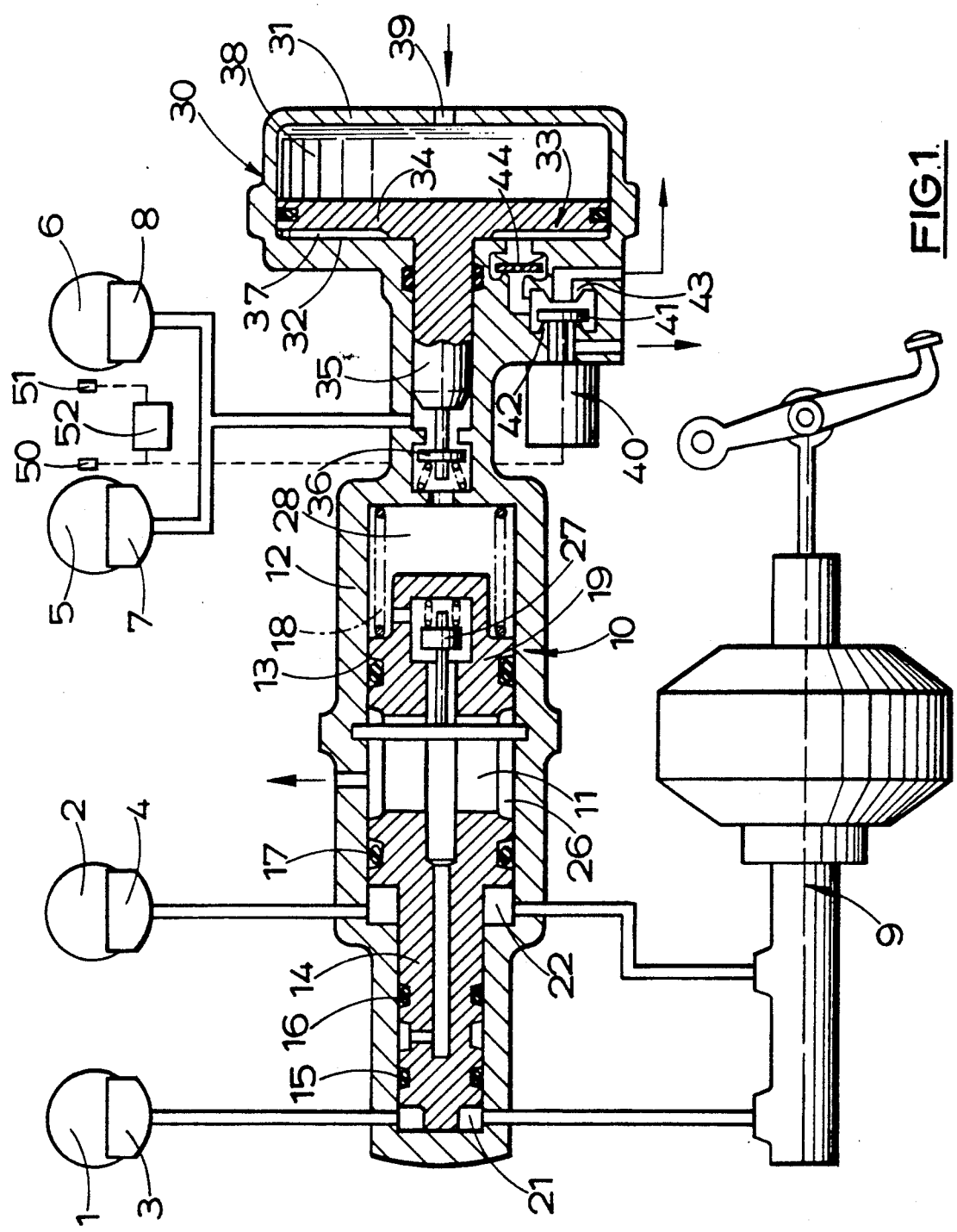
FIG. 1 is a layout of an hydraulic braking system with anti-lock control for the rear wheels.

In the braking system illustrated in the layout of FIG. 1, front wheels 1,2 of a vehicle are provided with brakes 3,4, and the rear wheels 5,6 are provided with brakes 7,8.

A pedal-operated booster-assisted master cylinder 9 assembly has two separate pressure spaces, and each pressure space is connected to a respective front wheel brake 3,4 through a control valve assembly 10 in the form of a rear balance piston unit which is adapted to apply to the rear brakes 7,8 a pressure dependent upon the mean value of the sum of the pressures applied to the brakes 3,4 on the two front wheels 1,2.

The unit 10 comprises a housing 12 provided with a stepped longitudinal bore 13 which is closed at both ends and in which works a stepped balance piston 14. The balance piston 14 has a portion of smaller area which carries axially spaced seals 15 and 16, and a portion of greater area, which carries a seal 17. Normally the piston 14 is urged by a spring 18 towards the end of the bore 13 which is of smaller diameter. A rear brake-applying portion 19, which also works in the portion of the bore 13 which is of greater diameter, is integral with a portion carrying the seal 17 to which it is connected by a slotted neck 11.

The master cylinder 9 leads to the brake 3 through a first chamber 21 exposed to the end of the piston 14 which is of smaller area, and the master cylinder 9 leads to the brake 4 through a second chamber 22 defined in the bore 13 between the two portions of the piston 14.

In the retracted position shown in the drawings, a reservoir for the master cylinder 9 is connected to a space 26 in the bore 13 surrounding the neck 11, and the space 26 is connected to the rear wheel brakes 7 and 8 through a normally-open recuperation valve 27 in the portion 19, a third chamber 28, and a rear wheel fluid powered anti-lock control unit 30.

The anti-lock control unit 30 comprises a housing 31 having a stepped bore 32 in which works a stepped de-boost piston 33. The piston 33 comprises a pressure-responsive movable wall 34 of greater area working in the portion of the bore which is of greater area, and an expander piston 35 of smaller area working in the portion of the bore which is of smaller area and which communicates with the third chamber 28 through a one-way valve 36 which is held open when the expander piston 35 is in the advanced position shown. In this position the effective volume of a de-boost chamber defined in the bore 32 between the expander piston 35 and the one-way valve 36 is at a minimum.

Chambers 37 and 38 are defined in the housing 30 on opposite sides of the movable wall 34. Chamber 38 comprises a constant pressure chamber and is permanently exposed to atmosphere through an orifice 39, and the chamber 37 comprises a variable pressure chamber and is adapted to be subjected to atmospheric pressure or vacuum under the control of a solenoid-operated valve 40 which includes a valve member 41 alternately engageable with one of a pair of axially spaced seats 42 and 43.

Normally the solenoid is de-energised and the valve member 41 engages with the seating 42. This isolates the chamber 37 from atmosphere, and subjects it to vacuum through an orifice 44. The movable wall 34 is therefore subjected to a pressure differential which holds the expander portion 35 in the advanced position described above.

The speed of each rear wheel 5,6 is sensed by a sensor 50,51, and speed signals from the sensors are fed into a control module 52 which is operative to energise the solenoid when the speed of a rear wheel attains critical deceleration.

In a normal inoperative position, the solenoid is de-energised and the de-boost piston 33 is held in its advanced position.

When the brake pedal is applied to operate the master cylinder 9 for normal braking, fluid under pressure from the master cylinder 10 is fed to the first and second chambers 21,22 of the unit 10. In consequence, the stepped piston 14 moves to isolate the reservoir connection from the third chamber 28 by closure of the recuperation valve 27 and to generate a pressure within it to apply both rear brakes 7,8 through the de-boost chamber. In this way the pressure in the third chamber 28, which is applied to the rear wheel brakes 7,8, is proportioned to the pressure applied to the front brakes 3,4.

The pressure differential acting over the movable wall 34 applies to the piston 33 a force sufficient to overcome the maximum rear pressure acting over the de-boost piston 35. In normal operation therefore the de-boost piston 35 does not interfere with the pressure applied to the rear brakes 7,8.

In a case in which one of the front brake circuits, comprising that brake, the respective pressure space in the master cylinder 9, and the respective first and second chamber 21,22, is inoperative, the master cylinder 9 will apply the operative front brake and the rear brakes 7 and 8, with the rear brakes 7 and 8 applied to a pressure equal to on half of the pressure of the operative front brake.

Should one or both of the rear wheels decelerate in a critical manner in response to operation of the rear wheel brakes 7,8, the solenoid-operated valve is energised to urge the valve member 41 out of engagement with the seating 42 and into engagement with the seating 43. This isolates the chamber 37 from vacuum and places it in communication with atmosphere. Pressure applied to the rear brakes 7 and 8 and acting on the expander portion 35 causes the piston 34 to retract, in turn to permit the one-way valve 31 to close and isolate the third chamber 28 from the brakes 7,8, and increase the effective volume of the de-boost chamber to relieve the pressure applied to the brakes 7,8.

When the anti-lock situation has been corrected, the solenoid is de-energised and vacuum is again restored to the chamber 37. This, in turn, restores the de-boost piston 33 to its advanced position, initially re-applying the brakes 7 and 8 by progressively reducing the effective volume of the de-boost chamber, and thereafter opening the one-way valve 36 to re-establish communication between the third chamber 28 and the brakes 7 and 8.

If the vacuum level is depleted during anti-lock operation, the de-boost piston 35 can still move readily to relieve brake pressure. When the brakes 7,8 are re-applied however, the level of rear pressure can only attain the level determined by the atmosphere/vacuum differential. If the frequency of anti-lock cycles deplete the vacuum level sufficiently, the cycles will cease as soon as the magnitude of rear pressure is insufficient to generate a skid. This feature provides a smooth efficient stop with the rear brakes 7,8 at constant pressure just below the ideal level.

Should the vacuum power source fail completely, the de-boost piston 35 will move to isolate the rear brakes 7,8. The front brakes 3,4 can still be applied to give braking at the front of the vehicle with stability provided from the free rolling rear wheels.

Figure 2:
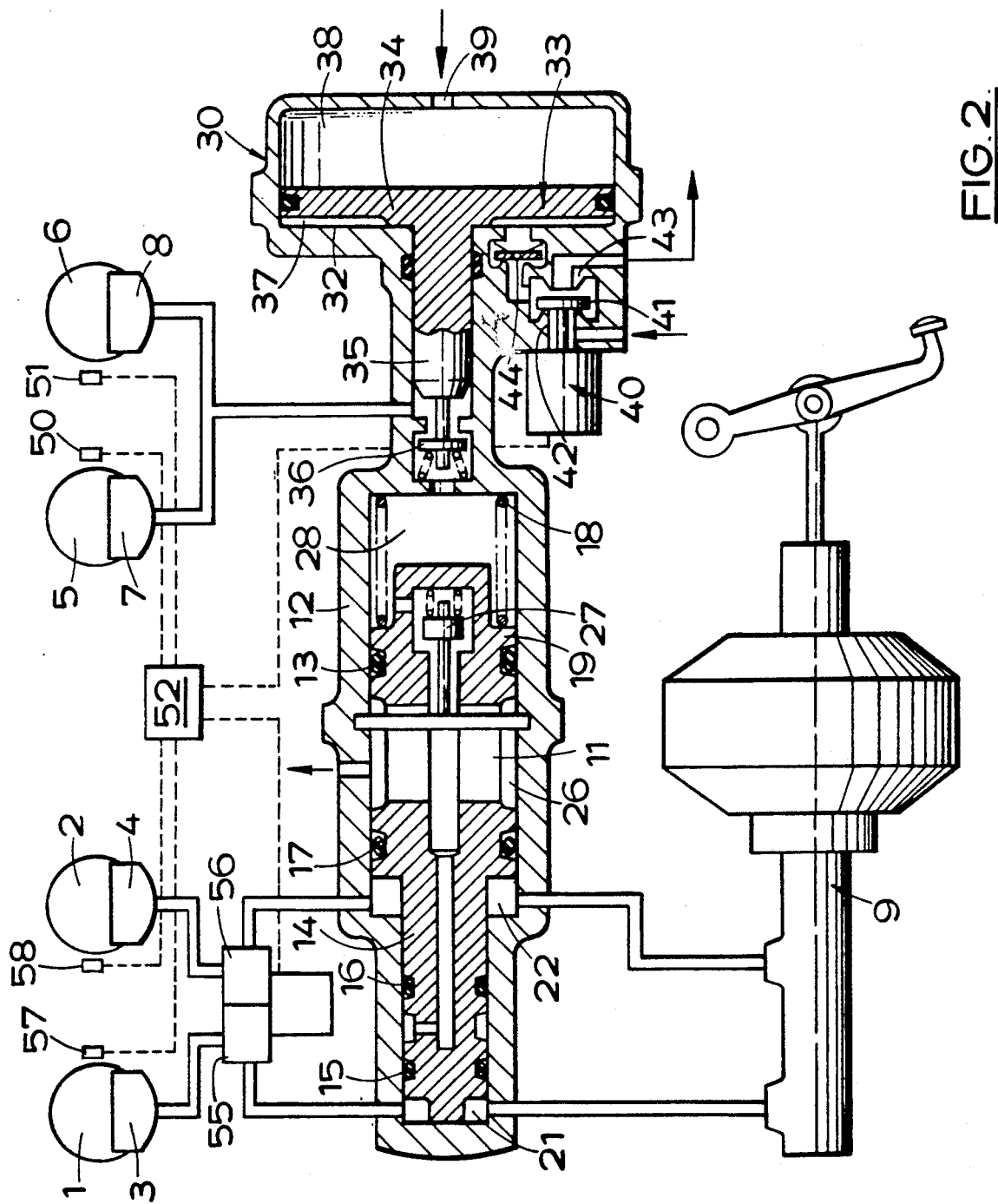
FIG. 2 is a layout of a system similar to FIG. 1 but with independent anti-lock control for the front wheels.

In the braking system illustrated in the layout of FIG. 2, the supply of fluid from each first and second chamber 21,22 to the respective front brake 3,4 is controlled by a respective anti-lock modulator 55,56 in accordance with the behaviour of the respective wheel sensed by a respective sensor 57,58 and as recognised by the control module 52. This system therefore provides individual anti-lock control of the front wheels 1,2, with shared anti-lock control of the rear wheels 5,6 as described; namely a three-channel system.

Should the vacuum power source fail, the front brakes 3,4 can still be applied with active motor powered anti-lock control to give a system with steering and stability.

The construction and operation of the system of FIG. 2 is otherwise the same as that of FIG. 1 and corresponding reference numerals have been applied to corresponding parts.

Figure 3:
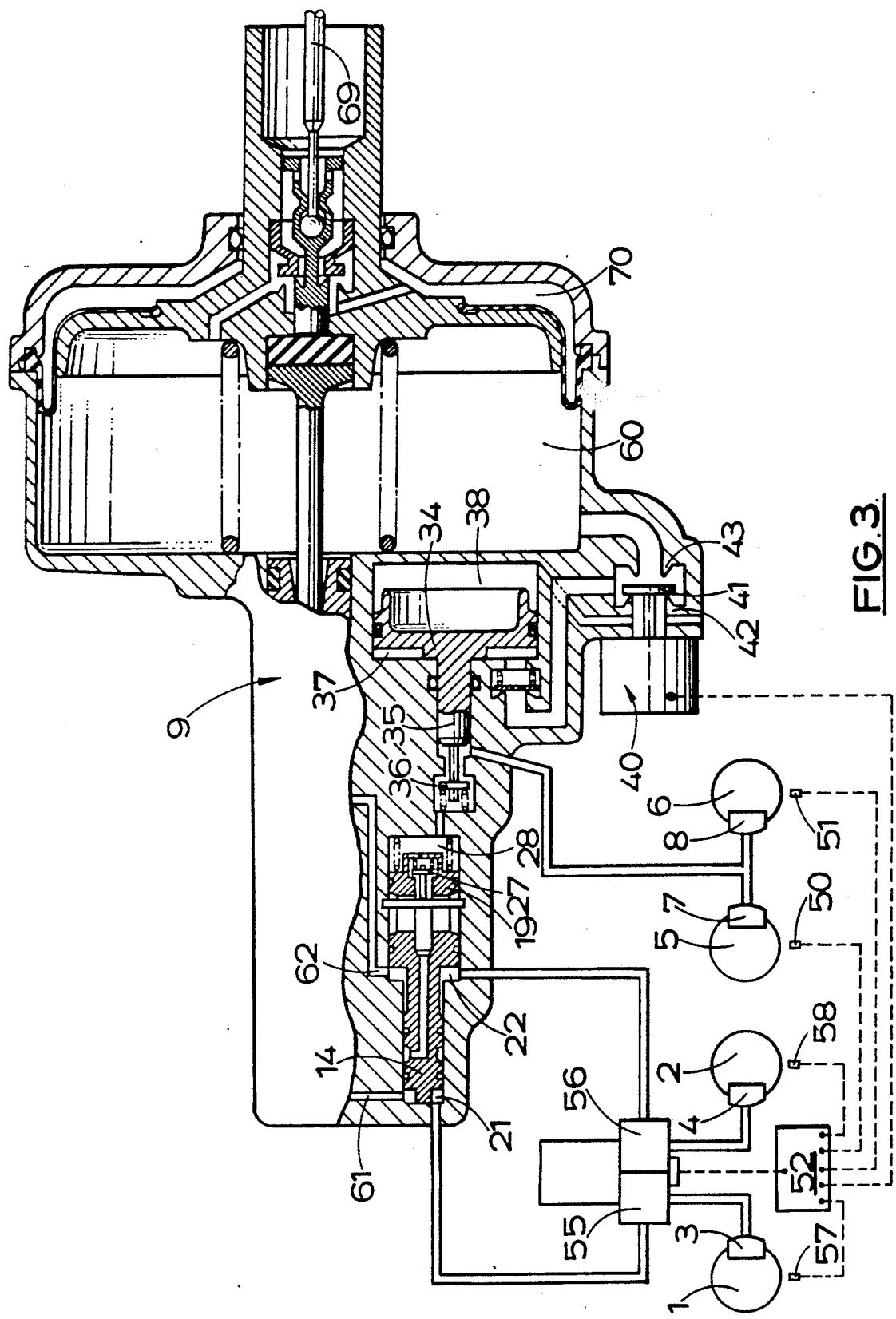
FIG. 3 is a layout of a system similar to FIG. 2 but integrated with a booster-operated master cylinder, assembly.

The system illustrated in FIG. 3 of the drawings is similar to FIG. 2 but shows an arrangement in which the rear balance piston unit 10 and the anti-lock control unit 30 are both incorporated in a common housing of the booster-assisted master cylinder assembly 9.

As illustrated the chamber 37 is supplied with vacuum from the constant vacuum chamber 60 of the booster, and external connections from the pressure space of the master cylinder to the chambers 21,22 are replaced by internal passages 61 and 62, respectively.

The construction and operation of the system of FIG. 3 is otherwise the same as that of FIG. 2, and corresponding reference numerals have been applied to corresponding parts.

Figure 4:
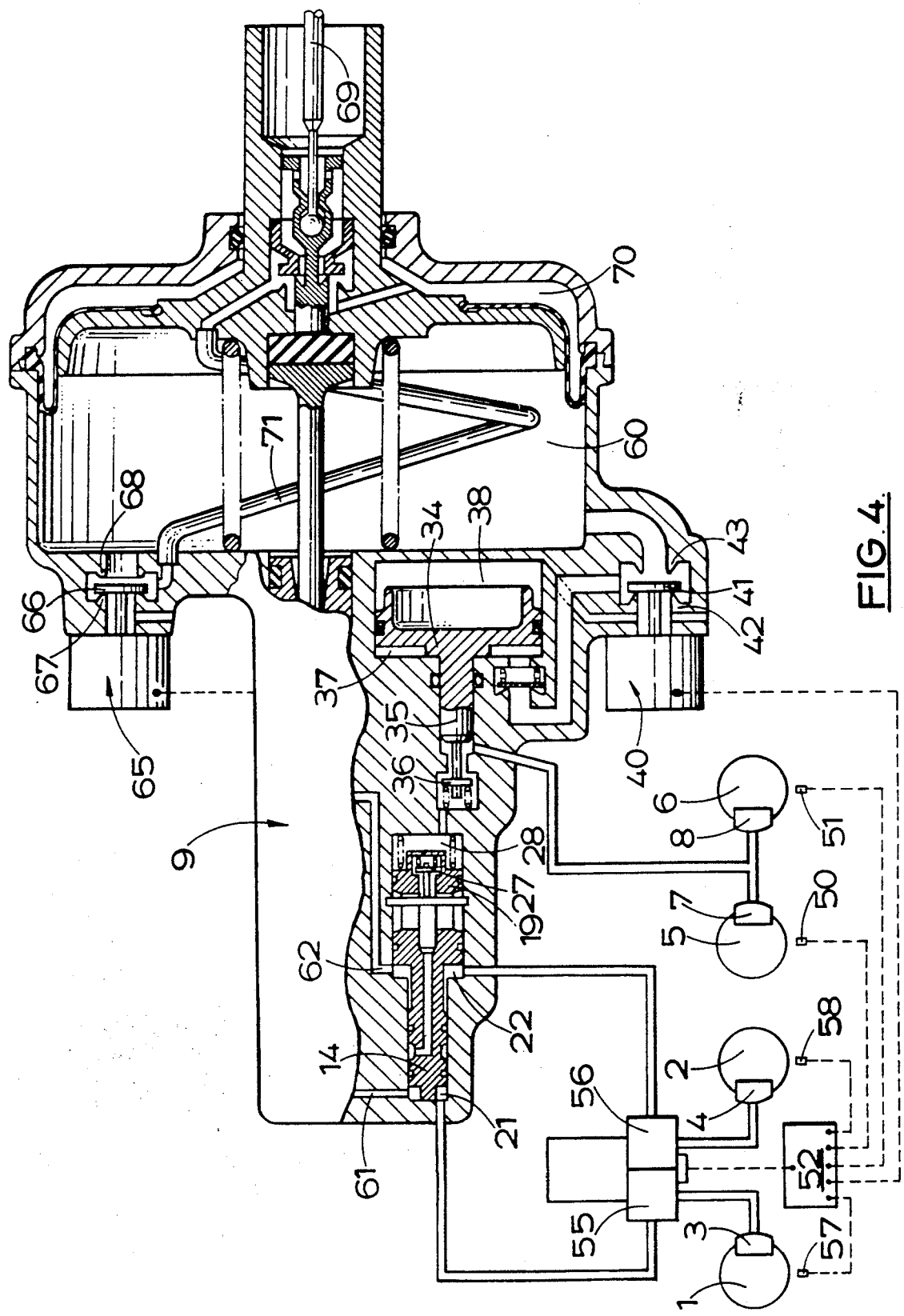
FIG. 4 is a layout similar to FIG. 3 but showing a modification.

The system illustrated in FIG. 4 of the accompanying drawings is similar to FIG. 3 but has been modified for use with a vehicle of the front wheel drive type in order to achieve traction control of the driven wheels.

A second solenoid-operated valve 65 similar to the valve 40, also including a valve head 66 for alternative engagement with one of a pair of spaced seatings 67, 68, is adapted to affect energisation and operation of the booster independently of a pedal-force applied to a push-rod 69. Specifically, when the solenoid is de-energised in a normal inoperative position, the head 66 engages with the seating 67 to isolate the power chamber 70 of the booster from atmosphere through an internal connection 71.

The solenoid valve 65 is responsive to energising currents from the control module 52. The control module 52 receives signals from the wheel speed sensors 50, 51 of the rear wheels 5, 6 and from the wheel speed sensors 57,58 of the front wheels 1, 2 for anti-lock control as before, but only from the front wheel sensors 57, 58 for traction control.

When the control module 52 receives a signal from the sensor of driven front wheel, say the wheel 1, indicating a wheel spin condition, both solenoid-operated valves 40 and 65 are energised, and the modulator 56 for the non-spinning wheel 2 is operated. Operation of the valve 65 moves the head 66 into engagement with the seating 68 to admit atmosphere into the chamber 70 through the connection 71. This energises the booster to operate the master cylinder in a known manner but independently of the foot pedal. Operation of the modulator 56 prevents the brake 4 on the front wheel 2 from being applied and energisation of the solenoid-operated valve 40 prevents the brakes 7, 8 on the rear wheels 5, 6 from being applied by operation of the anti-lock control unit 30 as described above.

Figure 5:
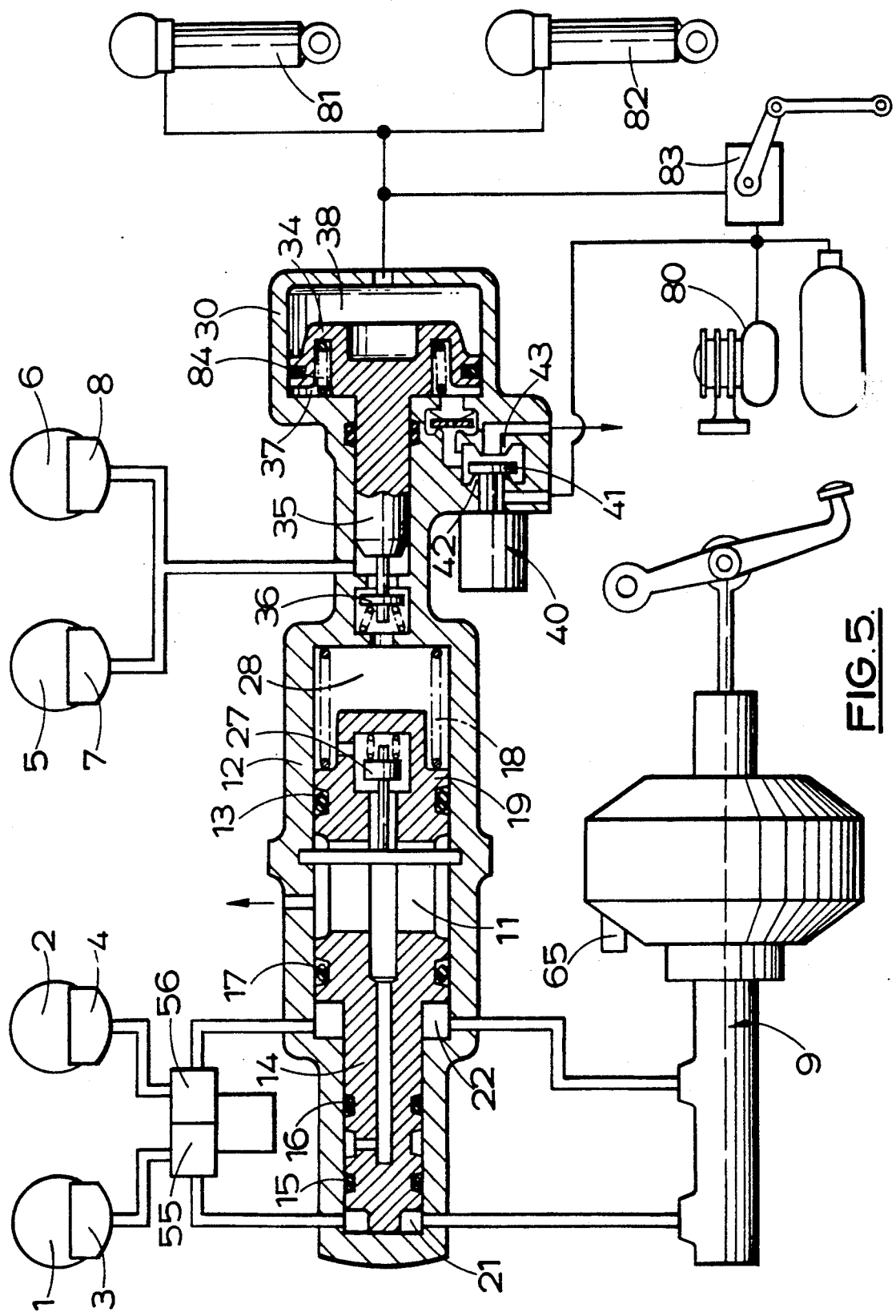
FIG. 5 is a layout similar to FIG. 2 but incorporated in a suspension system.

In the layout of FIG. 5, the system is modified to operate the anti-lock control unit 30 by means of a pressure differential between atmosphere, which is normally applied to the chamber 37 when the solenoid is de-energised and the head 41 is in engagement with the seating 42, and compressed air. The compressed air is supplied by a compressor 80 and that air is fed to the chamber 38 and suspension struts 81, 82 for the rear wheels 5, 6 of the vehicle under the control of a levelling valve 83. A compression spring 84 acts on the movable wall 34 to bias it in a direction in opposition to the pressure in the chamber 38 in order to correct the cut-in pressure of the anti-lock unit 30 for various laden cases of the vehicle, and the unit therefore acts as a load conscious limiting valve, for the rear brakes 7,8 when the brakes are applied normally.

In operation, energising current from the control module to the solenoid-operated valve 40, in response to an anti-lock signal or a wheel spin signal, causes the valve to isolate the chamber 37 from atmosphere and admit compressed air into it. The movable wall 34 and the piston 35 retract to modulate the supply of fluid to the brakes 7 and 8 on the rear wheels 5 and 6 as described above.

The construction and operation of the system of FIG. 5 is otherwise the same as that of FIGS. 2 and 4, and corresponding reference numerals have been applied to corresponding parts.

Figure 6:
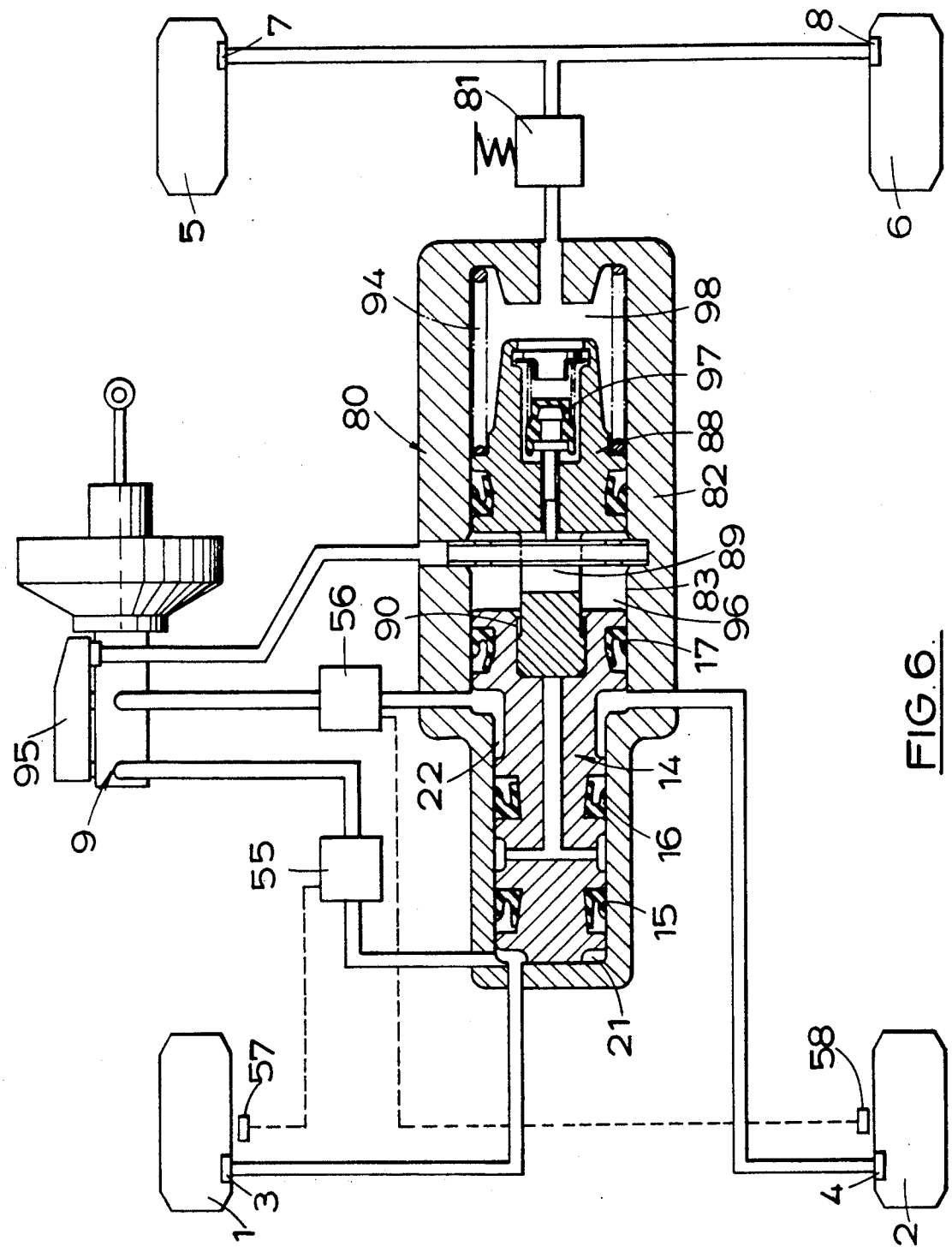
FIG. 6 is a layout of another system similar to FIG. 2 but showing a further modification.

The system shown in FIG. 6 of the drawings illustrates a two-channel anti-lock system.

In the system shown in FIGS. 6, the front wheel brakes 3,4 are controlled as described above with reference to FIG. 2, but the rear wheel brakes 7,8 are controlled by a control valve assembly 80 in the form of a rear balance piston unit which applies to the rear wheel brakes 7,8 through an apportioning valve 81 a pressure dependent upon the mean value of the sum of the pressures applied to the brakes 3,4 on the two front wheels 1,2.

The unit 80 comprises a housing 82 provided with a stepped longitudinal bore 83 which is closed at both ends and in which works the stepped balance piston 14. The balance piston 14 co-operates with a rear brake-applying piston 88 which works in the portion of the bore 83 which is of greater diameter, and which has a rearwardly directed piston-rod 89 received in a recess 90 in the adjacent end of the balance piston 84.

A compression return spring 94 acts on the piston 88 to urge it and the piston 84 into retracted positions in which the end of the portions of the piston 84 which is of smaller area co-operates with the adjacent closed end of the housing 82. In this position a reservoir 95 for the master cylinder 9 is connected to a space 96 in the bore 83 between the two pistons 84 and 88, and the space 96 is connected to the rear wheel brakes 7 and 8 through a normally-open recuperation valve 97 in the piston 88, and a third chamber 98 leading to the apportioning valve 81.

When the brake pedal is applied to operate the master cylinder 9 for normal braking, fluid under pressure from the master cylinder 9 is fed to the front brakes 3 and 4, and to the first and second chambers 21,22 of the unit 80. In consequence, the stepped piston 84 moves to isolate the reservoir connection from the third chamber 98 by closure of the recuperation valve 97 and to generate a pressure within it to apply both rear brakes 7,8 via the single apportioning valve 81. In this way, the input pressure to the apportioning valve 81 is proportional to the pressure applied to the front brakes 3 and 4.

In a half system failed case in which one of the front brake circuits is inoperative, the master cylinder 9 applies one front brake, say the brake 3, and both rear brakes 7,8 to half the pressure of the remaining front brake 3. Since this pressure is normally below the chosen cut-in pressure of the apportioning valve 81, the apportioning valve 81 will not cut in to modify the rise rate. Thus the vehicle will stop more effectively. For example, assume the front and rear pressures are equal up to the point at which the apportioning valve should normally cut in at 30 bar and the rear pressure is subsequently metered to 40 bar for a 60 bar front pressure, in the half system failed case, both rear brakes will be pressurised to 30 bar with 60 bar in the operative front brake 3.

For a vehicle with a nominal 70/30 braking ratio, the deceleration which can be achieved with a full system on a good road surface is 10m/sec$^2$. An 'X' split "half system failed" will give 5m/sec$^2$ but the system of FIG. 6 will produce 6m/sec$^2$—a 20% improvement in stopping power.

If the rear brakes circuit fails, both front brakes 3,4 can be applied and, with weight transfer, an 8m/sec$^2$ deceleration can be achieved.

Assume that the vehicle is travelling over a surface with the upper wheels 1,5 on higher friction, and the lower wheels 2,6 on lower friction.

In an anti-lock mode, the lower front wheel 2 will be controlled by the modulator 56 first to prevent that wheel from locking. In consequence, the pressure in the second chamber 22 will fall to create a force imbalance and the stepped piston 84 will move, driven by the reducing rear wheel pressure to force fluid out of the first chamber 21 and into the other front brake 3 of the wheel 1 on the higher friction surface. At the same time the pressures of both rear brakes 7,8 are reduced in proportion to the mean of the front brake pressures. If the upper front wheel 1 tends to lock, the pressure in the first chamber 21 is reduced and the piston 84 tends to move to reduce the pressure applied to the rear wheel brakes 7,8 and increase the pressure in the other front wheel brake 3. Thus each reduction in pressure applied to one front wheel brake is accompanied by a slight increase in the pressure applied to the other front wheel brake and a slight reduction in the pressure applied to the rear brakes 7,8. This sequence of operation produces a smooth even stop.

Although FIG. 6 shows the valve assembly 80 as a separate unit, it will normally be part of an assembly incorporating the two modulators 55 and 56.

For more expensive vehicles, the system may include extra modulators to control the common rear pressure, or independently to control the first and second chambers 21 and 22. Alternatively, either the first or second chamber 21 or 22 can be controlled directly with the other chamber connected to one of the front brakes.

Light commercial vehicles normally have a front-/rear braking split with a single load-conscious apportioning valve for the rear braking circuit. If the rear braking circuit fails, the vehicle will stop fairly well by operation of the brakes in the front braking circuit, and the free rolling rear wheels will maintain the vehicle stable. Alternatively, if the front circuit fails, only the rear wheel brake can be applied. This reduces the stopping power of the vehicle, and should a rear wheel lock, the vehicle becomes unstable. In such a situation, instability is further encouraged by the free rolling front wheels which permit the driver to steer into a skid. In short, steerable front wheels and locked rear wheels represents a very dangerous combination.

Figure 7:
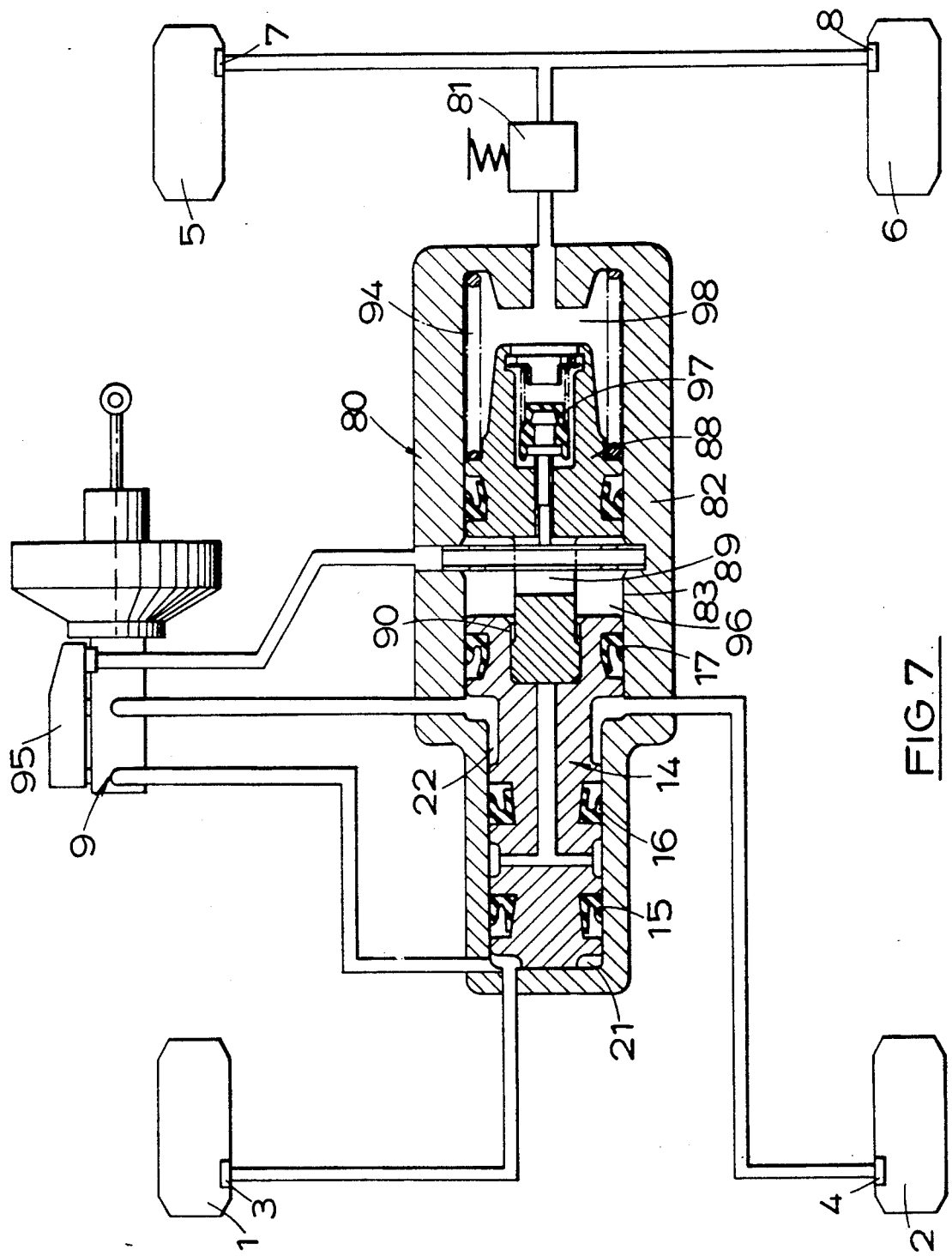
FIG. 7 is a layout similar to FIG. 6 but showing a modified system.

This problem is overcome in the system illustrated in the layout of FIG. 7 which is similar to FIG. 6 except that the modulators 55 and 56 have been omitted from the two braking circuits which include the front wheel brakes 3 and 4.

By splitting the front wheels into two separate braking circuits, each operable to apply both rear wheel brakes 7,8 by the use of the balance piston 84 as described above with reference to FIG. 6, and by omitting the modulators 55,56 thereby permitting a braked front wheel 1,2 of the vehicle to lock, vehicle stability can be achieved.

For example, upon failure of one of the independent front brake circuits, the rear wheel brakes 7,8 are applied at half the applied pressure so that the rear wheels 5,6 will normally be free rolling, the front wheel having the operative front brake will be locked, but the other front wheel of the failed circuit will be free rolling. This will, therefore, provide a stable vehicle which can be steered to avoid an obstacle.

A conventional system of the 'X' split type, with or without anti-lock, has similar benefits to those described above, namely that in the half system failed case one rear wheel will revolve to provide stability and its diagonally opposite front wheel will provide some steering.

Such a know system of the 'X' split type does not, however, exhibit all the benefits of the system of FIG. 7, in a much as it lacks the extra stopping power. In addition since both rear wheels of the system of FIG. 5 revolve, the vehicle is provided with a side force which increases the stability of the vehicle in comparison with the stability imparted by a single revolving rear wheel in the system of the 'X' split type.

The construction and operation of the system illustrated in the layout of FIG. 5 is otherwise the same as that of FIG. 6, and corresponding reference numerals have been applied to corresponding parts.

I claim:

1. Hydraulic braking system for vehicles of the four wheel type having a pair of front wheels, a pair of rear wheels, a front brake on each said front wheel, and a rear brake on each said rear wheel, said system comprising first brake-applying fluid pressure generating means for generating a pressure for applying said front wheel brakes, and second pressure-generating means for generating a pressure for applying said rear wheel brakes, wherein said pressure generated by said second pressure-generating means is dependent upon said pressure applied to at least one of said front wheel brakes by said first pressure generating means, and wherein said second pressure-generating means comprises and auxiliary master cylinder defined by an auxiliary piston working in a bore, a pressure space leading to said rear wheel brakes and defined by a portion of said bore in advance of said piston, and a recuperation valve means between said pressure space and a reservoir for fluid and which is adapted to close to isolate said pressure space from said reservoir upon initial movement of said piston in a brake-applying direction, further movement of said piston in the same direction pressurizing said fluid in said pressure space to apply said rear wheel brakes.

2. Hydraulic braking system as claimed in claim 1, comprising a control valve assembly for applying both said rear wheel brakes, and said control valve assembly includes said second pressure-generating means, wherein an output pressure from said second pressure-generating means is dependent upon the mean value of the sum of said pressure applied to the said two front wheel brakes.

3. Hydraulic braking system as claimed in claim 2, said pressure generated by said second pressure generating means is proportioned to the mean value of the sum of said pressure applied to the said two front wheel brakes.

4. Hydraulic braking system as claimed in claim 1, wherein a balance piston is adapted to co-operate with said auxiliary piston, and said balance piston has first and second pressure-responsive faces of substantially equal areas over each of which is adapted to act said pressure applied to a respective one of said front wheel brakes, said pressure-responsive faces being so arranged that the forces generated by said two front brake pressures act in the same direction.

5. Hydraulic braking system according to claim 4, wherein said auxiliary piston and said balance piston are combined into a single piston assembly.

6. Hydraulic braking system as claimed in claim 1, comprising sensing means responsive to the behavior of said rear wheels, at least one solenoid-operated valve responsive to signals from said sensing means, and a fluid-powered unit for controlling operation of said rear brakes under the control of said solenoid-operated valve.

7. Hydraulic braking system as claimed in claim 6, wherein said fluid powered unit utilizes a pneumatic pressure differential between compressed air and atmosphere.

8. Hydraulic system as claimed in claim 7, wherein said source of compressed air comprises a supply of compressed air for an air suspension system whereby pressure in rear wheel suspension struts is adapted to determine the magnitude of rear pressure which can be applied to said rear wheel brakes.

9. Hydraulic braking system as claimed in claim 6, wherein said fluid powered unit utilizes a pneumatic pressure differential between atmosphere and a source of vacuum.

10. Hydraulic braking system as claimed in claim 1, including a powered modulator for controlling the behavior of each said front wheel brake.

11. Hydraulic braking system for vehicles of the four wheel type having a pair of front wheels, a pair of rear wheels, a front brake on each said front wheel, and a rear brake on each said rear wheel, said system comprising first brake-applying fluid pressure generating means for generating a pressure for applying said front wheel brakes, second pressure-generating means for generating a pressure for applying said rear wheel brakes, wherein said pressure generated by said second pressure-generating means is dependent upon said pressure applied to at least one of said front wheel brakes by said first pressure generating means, sensing means responsive to the behavior of said rear wheels, at least one solenoid-operated valve responsive to signals from said sensing means, and a fluid-powered unit for controlling operation of said rear brakes under the control of said solenoid-operated valve, wherein said fluid powered unit comprises a stepped de-boost piston working in a stepped bore and having a first portion of smaller area exposed to said rear brake, and a second portion of larger area defining a pressure-responsive control member, an isolating valve, and a double-seated solenoid-operated valve, said de-boost piston normally being sustained in an advanced position by a pressure differential action across said control member, in which position said control member holds said isolating valve open, and said solenoid-operated valve acts in a first position to establish said pressure differential, movement of said solenoid-operated valve into a second position in response to a signal from said sensing means acting to destroy said pressure differential with the result that said piston moves into a retracted position, initially to permit said isolating valve to close and isolate said fluid pressure supply from said brakes and thereafter to increase the effective volume of a smaller portion of said bore in which said first portion works, whereby to relieve any pressure applied to said brakes.

12. Hydraulic system as claimed in claim 1, wherein said comprising means for resiliently biasing said pressure-responsive control member in one direction thereby to correct cut-in pressures for various laden cases.

13. Hydraulic braking system for vehicles of the four wheel type having a pair of front wheels, a pair of rear wheels, a front brake on each said front wheel, a brake-pressure modulator for each said front brake, and a rear brake on each said rear wheel, said system comprising first brake-applying fluid pressure generating means for generating a pressure for applying said front wheel brakes, second pressure-generating means for generating a pressure for applying said rear wheel brakes, wherein said pressure generated by said second pressure-generating means is dependent upon said pressure applied to at least one of said front wheel brakes by said first pressure generating means, sensing means responsive to the behavior of said rear wheels, at least one solenoid-operated valve responsive to signals from said sensing means, and a fluid-powered unit for controlling operation of said rear brakes under the control of said solenoid-operated valve, wherein a pneumatically-operated booster-assisted tandem hydraulic master cylinder is adapted to apply said front wheel brakes, and a second solenoid-operated valve means is provided to control operation of said booster independently of a foot pedal and in response to signals from wheel speed sensors associated with both front wheels, whereby said master cylinder is operated to apply the brakes but said brake on the non-spinning front wheel is prevented from being applied by said modulator for that wheel, and said brakes on said rear wheels are prevented from being applied by simultaneous energization of the solenoid-operated valve means for anti-lock control of the rear wheels.

* * * * *